US012430530B2

United States Patent
Singh et al.

(10) Patent No.: US 12,430,530 B2
(45) Date of Patent: Sep. 30, 2025

(54) REGISTERED LOWER ORBIT SATELLITE-POWERED GENERATIVE ARTIFICIAL INTELLIGENCE ("AI")-BASED LOST CARD TRACKING AND REPORTING MECHANISM

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 130 days.

(21) Appl. No.: 18/586,712

(22) Filed: Feb. 26, 2024

(65) Prior Publication Data

US 2025/0272530 A1 Aug. 28, 2025

(51) Int. Cl.
*G06K 19/077* (2006.01)
*G06K 19/07* (2006.01)
*G06Q 20/40* (2012.01)
*H04L 9/00* (2022.01)
*H04W 84/18* (2009.01)

(52) U.S. Cl.
CPC ... *G06K 19/07713* (2013.01); *G06K 19/0723* (2013.01); *G06K 19/07709* (2013.01); *G06Q 20/40* (2013.01); *H04L 9/008* (2013.01); *H04W 84/18* (2013.01)

(58) Field of Classification Search
CPC ......... G06K 19/07713; G06K 19/0723; G06K 19/07709; G06Q 10/40; G06Q 20/10; H04L 9/008; H04W 84/18; G06F 3/0484
See application file for complete search history.

(56) References Cited

U.S. PATENT DOCUMENTS 7,128,274 B2 10/2006 Kelley et al.
8,102,326 B2 * 1/2012 Schadler ................ H01Q 21/24
343/820

(Continued)

OTHER PUBLICATIONS

Scott Thornton, "NFC Basics: How to Use for Programming Automation," https://www.microcontrollertips.com/programming-automation-using-nfc-tags-faq/ May 31, 2018.

(Continued)

*Primary Examiner* — Vernal U Brown
(74) *Attorney, Agent, or Firm* — Weiss & Arons LLP

(57) ABSTRACT

A registered lower orbit satellite-powered generative artificial intelligence ("AI")-based lost active smart card ("ASC") tracking and reporting mechanism. The methods and systems may include detecting a threshold distance between a lost ASC and a user device. The lost ASC may initiate a reporting, may include a microwave communication transceiver, and may be associated with an originating entity. The methods and systems may include determining a threshold time that the lost ASC was located at least the threshold distance from the user device. The methods and systems may include tracking the geolocation of the lost ASC by submitting instructions to the lost ASC, instructing the lost ASC to emit a beeping noise, and reporting lost ASC geocoordinates to the originating entity. The lost ASC may emit the beeping noise in response to receipt of the instructions from a satellite network.

20 Claims, 8 Drawing Sheets

(56) References Cited

U.S. PATENT DOCUMENTS

| | | | |
|---|---|---|---|
| 8,256,667 B2 | 9/2012 | Poznansky et al. | |
| 8,880,028 B2 | 11/2014 | Han | |
| 9,864,944 B2 | 1/2018 | Radu et al. | |
| 10,621,574 B1 | 4/2020 | Rao | |
| 2007/0054696 A1* | 3/2007 | Cooner | H04W 88/02 |
| | | | 455/557 |
| 2008/0018496 A1* | 1/2008 | Tanner | G01S 5/0027 |
| | | | 340/992 |
| 2019/0174265 A1* | 6/2019 | Chen | G08B 21/0227 |
| 2019/0286805 A1 | 9/2019 | Law et al. | |
| 2020/0034830 A1 | 1/2020 | Ortiz et al. | |
| 2024/0272773 A1* | 8/2024 | De Jong | G06Q 10/08 |

OTHER PUBLICATIONS

"Contactless Smart Card," https://en.wikipedia.org/wiki/Contactless_smart_card, Wikimedia Foundation, Inc., Dec. 22, 2019.

Robert Triggs, "What is NFC and Does it Work," https://www.androidauthority.com/what-is-nfc-270730/, Android Authority, Retrieved on Jan. 27, 2020.

"How Does NFC Work," https://www.bluebite.com/nfc/how-does-nfc-work, Blue Bite LLC, Oct. 15, 2019.

Adithya Venkatesan, "How Things Work: NFC Can Be Active or Passive," https:/thetartan.org/2014/9/15/scitech/howthingswork, the Tartan Carnegie Mellon's Student Newspaper, Sep. 14, 2014.

Near Field Communication (NFC), https://www.geeksforgeeks.org/near-field-communication-nfc/, Geeks for Geeks, Retrieved on Jan. 27, 2020.

"Near-Field Communication," https://en.wikipedia.org/wiki/Near-Field_communication, Wikimedia Foundation, Inc., Jan. 20, 2020.

"Stored-Value Card," https://en.wikipedia.org/wiki/Stored-value_card, Wikimedia Foundation, Inc., Jan. 25, 2020.

Nathan Chandler, "What's an NFC Tag?" https://electronics.howstuffworks.com/nfc-tag1.htm, HowStuffWorks, a division of InfoSpace Holdings LLC, Retrieved on Jan. 27, 2020.

* cited by examiner

REGISTERED LOWER ORBIT SATELLITE-POWERED GENERATIVE ARTIFICIAL INTELLIGENCE ("AI")-BASED LOST CARD TRACKING AND REPORTING MECHANISM

FIELD OF TECHNOLOGY

Aspects of the disclosure relate to methods and systems for tracking and reporting a lost or stolen smart card using satellite technology.

BACKGROUND OF THE DISCLOSURE

Cards used for performing transactions including financial transactions, purchasing products, gift cards, mass transit and personal identification, may include, embedded in the cards, multiple methods of performing the transactions. These cards include, but are not limited to, one or more magnetic strips that can be swiped at a card reader device, a Europay, Mastercard, and Visa ("EMV") chip to be inserted into a device and a microwave chip for a contactless transaction. These cards may be referred to herein in the alternative as purchasing instruments.

Microwave communication is a rapidly growing long-range technology. Cards that include a microwave chip may be enabled to transfer information stored on a microwave tag within the card to a microwave-enabled device, e.g., a smartphone or point-of-sale ("POS") device. These cards typically are powered by a battery. The battery provides sufficient power to the card to enable the card to passively transmit the information to the microwave-enabled device. The microwave enabled device can then retrieve the passively transferred information.

These cards may be called "cards," "smart cards," and "active smart cards" ("ASCs"). Conventional smart cards rely upon other devices to make a transaction. However, when an individual needs to make a payment to another individual, the POS device or other suitable device is typically required for completing the transaction.

With the rapid growth of the space and satellite industry, both private and government companies are launching lower orbit satellites for communication and navigation. There exists a need for a registered lower orbit satellite-powered generative AI-based lost card tracking and reporting mechanism.

Smart cards are frequently getting lost. Sometimes smart cards are even stolen. But there are no methods available to find a lost or stolen smart card with no human intervention.

Lost or stolen cards may lead to unauthorized transactions, potential financial losses, and identity theft. When a card is lost or stolen, cardholders may experience anxiety, inconvenience, and uncertainty about their financial security.

The impact of lost or stolen cards may be significant. First, there may be financial loss. Unauthorized transactions may lead to financial losses for both cardholders and issuing financial institutions. Second, there may be reputational damage. Frequent incidents of lost or stolen cards can harm the reputation of financial institutions. And third, there may be customer trust issues. Repeated issues may erode the trust customers have in the security of their cards.

Addressing the issue of lost or stolen cards requires collaboration between financial institutions, technology providers, and law enforcement bodies to create a secure and efficient card ecosystem for all stakeholders.

Therefore, it would be desirable to enable a lost smart card to directly communicate with a registered lower orbit satellite. It would further be desirable to enable the lost smart card tracking via registered lower orbit satellite to disable lost and stolen smart card transactions.

Additionally, certain geographical areas may experience smart card theft. If one area has a high crime rate, and many smart cards are reported stolen there, that area may be considered a dangerous area to transact.

On the other hand, if an area has a low crime rate, and a lower number of smart cards are reported stolen there, that area may be considered a safe area to transact. Generative artificial intelligence ("AI") may be able to determine which areas are dangerous for smart card transactions based on a lost card tracking and reporting mechanism.

Therefore, it would be further desirable to provide systems and methods for a registered lower orbit satellite-powered generative AI-based lost card tracking and reporting mechanism.

SUMMARY OF THE DISCLOSURE

Aspects of the disclosure relate to methods and systems for providing a registered lower orbit satellite-powered generative AI-based lost ASC tracking and reporting mechanism. The terms ASC, smart card, and card may be used interchangeably herein.

The methods and systems may include detecting a threshold distance between a lost ASC and a user device. The lost ASC may initiate a reporting, may include a microwave communication transceiver, and may be associated with an originating entity. The methods and systems may include determining a threshold time that the lost ASC was located at least the threshold distance from the user device.

The methods and systems may include determining a length of time during which the ASC was located, away from the user device, at a distance greater than or equal to the threshold distance. The methods and systems may include determining that the length of time is at least as great as a threshold time. The methods and systems may include initiating, in response to determining that the length of time is at least as great as a threshold time, a microwave communication with other microwave communication devices.

The methods and systems may include tracking the geolocation of the lost ASC by submitting instructions to the lost ASC, instructing the lost ASC to emit a beeping noise, and reporting lost ASC geocoordinates to the originating entity. The lost ASC may emit the beeping noise in response to receipt of the instructions from a satellite network.

Provided herein is a registered lower orbit satellite-powered generative AI-based lost-card tracking and reporting mechanism. The mechanism may include a technology wherein a registered lower orbit satellite may trace the geocoordinates of the lost card and report them for further tracking and recovery. The mechanism may include a technology that may enable the satellite to start tracking a card after a threshold amount of time. Once the card loses proximity or connection with its owner's device, which is identified through a mobile app, after the threshold time elapses, a lower orbit satellite may be automatically triggered and may start looking for the card's geolocation.

The mechanism may include technology that may allow the card tracking mechanism only when the card user has registered with the lower orbit satellite prior and in advance. The mechanism may include technology that may allow for only a registered card to avail a satellite's services.

The mechanism may include technology that may allow for lost card tracking. For example, on a lost card, the mechanism may include technology that may enable a nearest satellite load to pick a trace from a lost card, and then process lost card data. The nearest satellite load may then report the card location to nearby cards, nearby POS/ATMs, and nearby card users—for precise monitoring.

Each of the nearby smart cards may sense the presence of a stolen/lost card and report the same to nearby card users, ATM machines, POS machines, and financial institutions. The mechanism may include technology that may function by reporting the microwave communication identification ("ID") of the stolen card to all the cards in a card network. And whenever a card senses a lost/stolen card in its proximity, it may report the lost/stolen card's geocoordinates to, e.g., a financial institution, and start beeping.

The mechanism may include technology that may work by creating a generative AI pattern of the geocoordinates of the most found locations of stolen cards. Satellites may report the geocoordinates of the stolen cards when sensed and report the same to, e.g., a financial institution, so that a generative AI pattern may be created. The generative AI pattern may have red and yellow areas depicting higher and less severe zones of theft, respectively.

The mechanism may include technology that may share the details of the lost card and card holder details through homomorphic encryption with the other smart cards.

ATM and POS machines may also identify the microwave communication ID of the stolen/lost card and may prevent the performance of a transaction with any card having that microwave communication ID. This may result in preventing a fraudster from performing a transaction using a stolen card, anywhere around the world.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
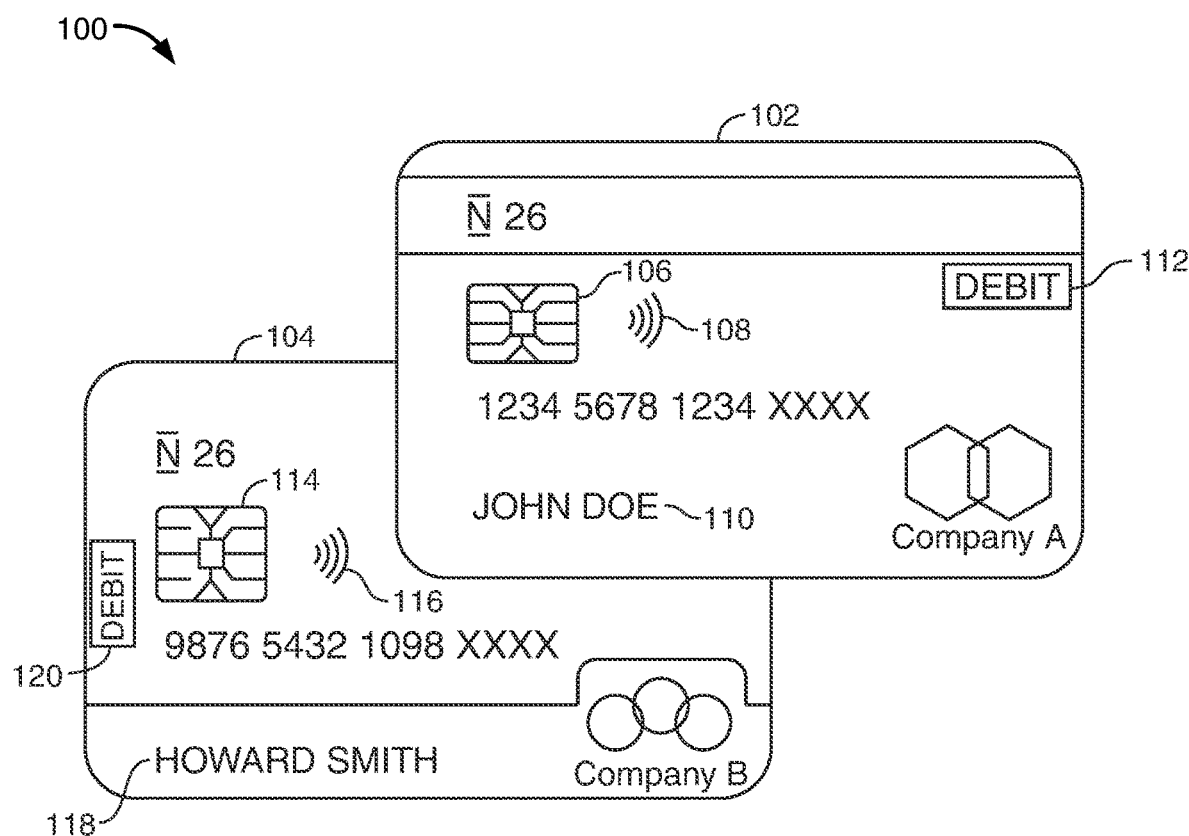
FIG. 1 shows an illustrative exemplary diagram in accordance with principles of the disclosure.

An ASC for a registered lower orbit satellite-powered generative AI-based lost ASC tracking and reporting is provided. The ASC may include a microwave communication transceiver. The microwave communication transceiver may include a microwave transceiver. The microwave transceiver may be configured to enable microwave communication with another microwave-enabled device. Microwave communication is a subcategory of wireless communication. Other forms of microwave communication may be used for longer-distance communications (e.g., between an ASC and satellite).

The ASC may also include a battery. The battery may be configured to power the microwave transceiver. The battery may be an internal battery on the inside of the ASC. The battery may be an external battery pack on the outside of the ASC.

The battery may include, e.g., polymer fuel cell technology, solar cell technology, and any other suitable fuel source. The battery may be configured to provide a single burst of energy to enable the transceiver to transmit the ASC's data to a lower orbit satellite within a satellite network. The battery may be configured to provide multiple bursts of energy to enable the transceiver to transmit the ASC's data multiple times to a lower orbit satellite within a satellite network. The battery may be configured to enable the ASC to emit one or more beeps or signals, and wait a threshold time, e.g., 15 minutes, to conserve power.

The ASC may be associated with an originating entity. The originating entity may be an entity that issues ASCs. The originating entity may be associated with a financial institution.

The ASC may also include a microwave communication transceiver. The microwave communication transceiver may be configured to enable microwave communication with another microwave communication-enabled device.

The ASC may also include a keypad. The keypad may include a display. The keypad may also include alphanumeric keys that may be configured to be depressed. The keypad may be capacitive. The keypad may be on a touch screen. It should be appreciated that the ASC that includes the keypad, may have a thickness wherein the ASC, at its thickest point, may not be thicker than 0.8 millimeters ("mm"). The width and height of the ASC may not be smaller than 90% of a width of 86 mm and not smaller than 90% of a length of 54 mm.

The keypad may be embedded on the ASC. The keypad embedded on the ASC may not extend the thickness more than 0.8 mm.

The ASC may also include a microprocessor. The microprocessor may enable processing, storing, and transmitting ASC data. The microprocessor may further be enabled to communicate with a payment network associated with the originating entity. The communication may enable completion of a transaction between the ASC and another entity.

The ASC may also include a nano microwave network interface card ("NIC") card. The NIC may enable establishing a microwave connection to a Wi-Fi device. The Wi-Fi device may enable the communication of the ASC and the payment network.

The ASC may also include a display connector. The display connector may be configured to intermediate between the keypad, the display, and the microprocessor.

Components of the ASC may be arranged such that a total thickness of the ASC is less than or equal to 0.8 mm. For example, the keypad, the microprocessor, the microwave transceiver, the battery, the NIC and the display connector may be arranged such that a total thickness of the ASC is less than or equal to 0.8 mm.

Apparatus for an ASC is provided. The ASC may be 86 mm×54 mm×0.8 mm.

ASCs, for purposes of the disclosure, may include one or more types of payment instruments. The payment instrument may include, but may not be limited to, a credit card, debit card, automatic teller machine ("ATM") card, phone payment card, stored-value card, and gift card.

The direct communication between the ASC and another microwave-enabled device may enable the signaling of a lost ASC. Direct communication may be enabled using microwave technology. Microwave standards cover communications protocols and data exchange formats.

Microwave may be a standard for microwave data transition and may adhere to certain specifications to be able to communicate properly with each other. Like other microwave signals like Bluetooth and Wi-Fi, microwave works by sending information over radio waves. The microwave technology may be based on radio-frequency identification ("RFID") that may use electromagnetic induction to be able to transmit information. Bluetooth connections may be enabled to transmit data up to about 10 meters from the source. Microwave communications may be enabled to exchange data up to about 200 km-2000 km from the source.

Microwave communications may operate at 1-100,000 Kbps. Microwave communications may transmit at a speed of 2.45 gigahertz to 5.8 gigahertz ("Ghz"). Microwave data is transmitted in a microwave Data Exchange Format ("NDEF"), using the Simple NDEF Exchange Protocol ("SNEP"). SNEP uses a Layer 2 logical Link Control Protocol ("LLCP"). This may be connection-based to provide reliable data delivery.

A method for performing a registered lower orbit satellite-powered generative AI-based lost ASC tracking and reporting mechanism is provided.

The method may include detecting a threshold distance between a lost ASC and a user device. The lost ASC may be an initiator of a reporting. The reporting may be a communication from the lost ASC to a registered low orbit satellite in a satellite network.

The lost ASC may include a microwave transceiver. The lost ASC may include a keypad, and, at its thickest point, is not thicker than 0.8 mm, the initiating enabled using the microwave transceiver. The lost ASC may be associated with an originating entity.

The method may include, in response to receiving the reporting from the ASC, determining a threshold time that the lost ASC was located from the user device at a distance that is at least as great as the threshold distance.

The method may include initiating, in response to determining that the lost ASC and the user device have been maintained at a distance that is at least as great as the threshold distance for at least the threshold time, a microwave communication between the lost ASC and the registered lower orbit satellite in a satellite network. The registered lower orbit satellite in the satellite network may be a target of the reporting.

The method may include securing, using a microwave communication ID, a line of communication between the microwave transceiver and the registered lower orbit satellite in the satellite network. The microwave communication ID may also be called a microwave communication ID. The method may include receiving, from the microwave transceiver on the lost ASC, the microwave communication ID. The method may include verifying the microwave communication ID with the originating entity. The microwave communication ID may be transmitted to the registered lower orbit satellite by a microprocessor of the lost ASC.

The method may include, in response to the verifying, further securing the line of communication between the microwave transceiver and the registered lower orbit satellite in the satellite network. The method may include receiving, from the lost ASC, a geolocation.

The geolocation of a lost ASC may be obtained by, e.g., a directional receiver array and a triangulation. The directional receiver array may include a lower orbit satellite and a lost ASC. The lower orbit satellite may include an array of receivers. The receivers may be able to detect a signal direction from the lost ASC. From both the position of the lower orbit satellite and the signal direction detected by the directional receiver array, a line may be drawn to the lost ASC.

The triangulation may include three or more points. The triangulation may involve determining a range or distance from each of the three or more points to the lost ASC. The triangulation may calculate a solution satisfying a variety of ranges or distances from each of the three or more points to the lost ASC. The three or more points may be three or more locations of, e.g., lower orbit satellites and ASCs. For example, a lower orbit satellite location may be a first point in the triangulation, the lower orbit satellite moving to a new location may be a second point in the triangulation, and the lost ASC may be a third point in the triangulation.

Another example of the triangulation may include three lower orbit satellite locations. Further, the triangulation may include two lower orbit satellite locations and one ASC card location. As another example, the triangulation may include two ASC card locations and one lower orbit satellite location. One other example of the triangulation may include three ASC card locations.

The geolocation of a lost ASC may be obtained by any other suitable means, e.g., global positioning system ("GPS"), ASC data, and ASC-to-ASC, ASC-to-satellite, ASC-to-POS, and ASC-to-ATM distance calculations. For example, a lower orbit satellite may obtain the geolocation of a lost ASC from other ASCs.

The method may include encrypting, using a homomorphic card data encryptor associated with the lost ASC, the geolocation of the lost ASC. The method may include receiving, from the lost ASC, a homomorphically encrypted geolocation.

The method may include transmitting, using a microprocessor, the homomorphically encrypted geolocation of the lost ASC to ASCs located within a threshold distance from the lost ASC. The method may include verifying and thereby further securing, that the homomorphically encrypted geolocation is equal to the geolocation of the lost ASC.

The method may include, in response to the verifying, tracking the geolocation of the lost ASC by submitting instructions to the lost ASC, instructing the lost ASC to emit a beeping noise, and reporting lost ASC geocoordinates to the originating entity. The lost ASC may emit the beeping noise in response to receipt of the instructions from the satellite network.

The method may include, following the initiating, retrieving, by the lost ASC, data associated with the originating entity of the ASCs located within a threshold distance from the lost ASC. The method may include confirming that the originating entity associated with the lost ASC is the originating entity of the ASCs located within a threshold distance from the lost ASC. The method may include, when the originating entity associated with the lost ASC is not the originating entity, terminating the microwave communication. The method may include, when the originating entity for the lost ASC is the originating entity of the ASCs located within a threshold distance from the lost ASC, enabling the microwave communication.

The method may include, following the in response to the verifying, generating geographical patterns via a generative AI builder. The geographical patterns may be based on geolocations of stolen ASCs located within a threshold area. The method may include adapting the generative AI builder to dynamic ASC geolocation data.

The method may include, following the generating geographical patterns via a generative AI builder, forming a network of stolen ASCs via a card network former. The network of stolen ASCs may be based on the geolocations of stolen ASCs located within a threshold area. The network of stolen ASCs may determine the geographical patterns for a red zone. A red zone may be an area with greater than a threshold number of stolen ASCs. A yellow zone may be an area with a threshold number of stolen ASCs. And a green zone may be an area with less than a threshold number of stolen ASCs.

The method may include, following the forming a network of stolen ASCs via a card network former, modifying the geographical patterns by an adaptive AI-based fraud detector. The adaptive AI-based fraud detector may continuously monitor and modify the geographical patterns. The adaptive AI-based fraud detector continuously monitoring and modifying the geographical patterns may be based on an assessment of fraud. The assessment of fraud may be made by detecting changes in stolen ASCs within the threshold area.

The method may include, following the in response to the verifying, reporting information regarding the lost ASC to an ATM via an ATM machines informer. The method may include, following the in response to the verifying, reporting information regarding the lost ASC to a POS machine via a POS machines informer.

The method may include, following the in response to the verifying, declining an ASC transaction for the lost ASC via a transaction decline module.

The lost ASC and the ASCs located within a threshold distance from the lost ASC may each be equal to a size not smaller than 90% of 86 mm (width)×54 mm (height).

Within a red zone, ASC transactions may not be allowed. Within a red zone, ASC transactions require multi-factor authentication. Within a yellow zone, ASC transactions over $100 may not be allowed. Within a green zone, ASC transactions over $1000 may not be allowed.

A lost ASC may include a microwave transceiver. The microwave transceiver may be configured to enable a microwave communication with another microwave-enabled device. The lost ASC may include a battery configured to power the microwave transceiver. The battery may be capable of providing the lost ASC a burst of energy to power a microwave communication. The battery may be capable of providing the lost ASC multiple bursts of energy to power a microwave communication. The battery may be made of any suitable material, e.g., a polymer fuel cell.

An originating entity may be associated with the lost ASC. The lost ASC may have a thickness, at its thickest point, that is not thicker than 0.8 mm. The lost ASC may have a width and height that is not smaller than 90% of a width of 86 mm. The lost ASC may have a width and height that is not smaller than 90% of a height of 54 mm.

The lost ASC may include an embedded keypad. The keypad may include a display and alpha-numerical keys. Each alpha-numerical key may be configured to be depressed. The keypad may not extend a thickness greater than 0.8 mm.

The lost ASC may include a microprocessor enabling processing, storing, and transmitting card ID data. The microprocessor may be further enabled to communicate with a payment network associated with the originating entity.

The lost ASC may include a nano microwave NIC card. A nano microwave NIC card may enable a microwave connection to a user device. The lost ASC may include a display connector. The display connector may be configured to intermediate between the keypad, the display, and the microprocessor.

When the lost ASC is within a pre-determined distance of a user device, the user device including a microwave transceiver, the lost ASC and the user device may be configured to activate the microwave communication and activate a registered lower orbit satellite in a satellite network to perform a registered lower orbit satellite-powered generative AI-based lost ASC tracking and reporting mechanism.

The mechanism may include detecting a threshold distance between the lost ASC and the user device. The lost ASC may be an initiator of a reporting. The reporting may include a communication from the lost ASC to a registered low orbit satellite in a satellite network.

The lost ASC may include a microwave transceiver. The lost ASC may be associated with an originating entity. The mechanism may include determining a threshold time that the lost ASC was located at least the threshold distance from the user device.

The mechanism may include initiating, in response to determining that the lost ASC and the user device have been maintained at the threshold distance for at least a threshold time, a microwave communication between the lost ASC and a registered lower orbit satellite in a satellite network. The registered lower orbit satellite in a satellite network may be a target of the reporting. The lost ASC may include a keypad, and, at its thickest point, may not be thicker than 0.8 mm. The initiating may be enabled using the microwave transceiver.

The mechanism may include securing, using the microwave communication ID, a line of communication between the microwave transceiver and the registered lower orbit satellite in the satellite network. The mechanism may include receiving, from the microwave transceiver on the lost ASC, the microwave communication ID. The mechanism may include verifying the microwave communication ID with the originating entity. The microwave communication ID may be transmitted to the registered lower orbit satellite by a microprocessor of the lost ASC.

The mechanism may include, in response to the verifying, further securing the line of communication between the microwave transceiver and the registered lower orbit satellite in the satellite network. The mechanism may include encrypting, using a homomorphic card data encryptor associated with the lost ASC, the geolocation of the lost ASC.

The mechanism may include receiving, from the lost ASC, a homomorphically encrypted geolocation. The method may include transmitting, using a microprocessor, the homomorphically encrypted geolocation of the lost ASC to ASCs located within a threshold distance from the lost ASC.

The mechanism may include verifying and thereby further securing, that the homomorphically encrypted geolocation is equal to the geolocation of the lost ASC.

The mechanism may include, in response to the verifying, tracking the geolocation of the lost ASC by submitting instructions to the lost ASC, instructing the lost ASC to emit a beeping noise, and reporting lost ASC geocoordinates to the originating entity; the lost ASC emitting the beeping noise in response to receipt of the instructions from the satellite network.

The mechanism may include following the initiating, retrieving, by the lost ASC, data associated with the originating entity of the ASCs located within a threshold distance from the lost ASC. The mechanism may include confirming that the originating entity associated with the lost ASC is the originating entity of the ASCs located within a threshold distance from the lost ASC.

The mechanism may include, when the originating entity associated with the lost ASC is not the originating entity, terminating the microwave communication. The mechanism may include, when the originating entity for the lost ASC is the originating entity for the ASCs located within a threshold distance from the lost ASC, enabling the microwave communication.

The mechanism may include, following the in response to the verifying, the mechanism comprising generating geographical patterns via a generative AI builder, wherein the geographical patterns are based on geolocations of stolen ASCs located within a threshold area, and the generative AI builder adapts to dynamic ASC geolocation data.

Provided herein is a smart card system. The system may enable performing a registered lower orbit satellite-powered generative AI-based lost ASC tracking and reporting mechanism.

The system may include a lost ASC. The lost ASC may include a microwave transceiver configured to enable a microwave communication with another microwave-enabled device. The lost ASC may include a battery configured to power the microwave transceiver. The lost ASC may include an originating entity associated with the lost ASC. The lost ASC may have a thickness, at its thickest point, that is not thicker than 0.8 mm. The lost ASC may have a microprocessor enabling processing, storing, and transmitting card ID data. The microprocessor may be enabled to communicate with a payment network associated with the originating entity. The lost ASC may include a nano microwave NIC card to enable establishing a microwave connection to a user device.

The system may include an originating entity associated with the lost ASC. The system may include a registered lower orbit satellite in a satellite network. The system may include a user device.

The registered lower orbit satellite may perform a registered lower orbit satellite-powered generative AI-based lost ASC tracking and reporting mechanism. The registered lower orbit satellite may detect a threshold distance between a lost ASC and the user device. The lost ASC may be an initiator of a reporting. The lost ASC may include a microwave transceiver. The lost ASC may be associated with an originating entity. The registered lower orbit satellite may determine a threshold time that the lost ASC was located at least the threshold distance from the user device.

The registered lower orbit satellite may initiate, in response to determining that the lost ASC and the user device have been maintained at the threshold distance for at least a threshold time, a microwave communication between the lost ASC and a registered lower orbit satellite in a satellite network. The registered lower orbit satellite in a satellite network may be a target of the reporting. The lost ASC may include a keypad. The lost ASC, at its thickest point, may be 0.8 mm. The registered lower orbit satellite initiating may be enabled using a microwave transceiver.

The registered lower orbit satellite may secure the reporting by microwave communication ID using the registered lower orbit satellite in the satellite network. The registered lower orbit satellite may receive from the microwave transceiver on the lost ASC, the microwave communication ID.

The registered lower orbit satellite may verify the microwave communication ID with the originating entity. The microwave communication ID may be transmitted to the registered lower orbit satellite by a microprocessor of the lost ASC.

The registered lower orbit satellite may receive, from the lost ASC, a geolocation. The registered lower orbit satellite may encrypt, using a homomorphic card data encryptor associated with the lost ASC, the geolocation of the lost ASC. The registered lower orbit satellite may receive, from the lost ASC, a homomorphically encrypted geolocation. The registered lower orbit satellite may transmit, using a microprocessor, the homomorphically encrypted geolocation of the lost ASC to ASCs located within a threshold distance from the lost ASC. The registered lower orbit satellite may verify and thereby further secure, that the homomorphically encrypted geolocation is equal to the geolocation of the lost ASC.

The registered lower orbit satellite may, in response to the verifying, track the geolocation of the lost ASC by submitting instructions to the lost ASC. The registered lower orbit satellite may instruct the lost ASC to emit a beeping noise. The registered lower orbit satellite may report lost ASC geocoordinates to the originating entity. The lost ASC may emit the beeping noise in response to receipt of the instructions from the satellite network. When the originating entity for the lost ASC is the originating entity of the ASCs located within a threshold distance from the lost ASC, the system may enable microwave communication.

One ASC may communicate with another ASC. It may be a problem, however, if one ASC becomes lost or stolen. It would be desirable to use lower orbit satellites to detect and report lost and stolen cards using generative AI.

A satellite may be pre-registered within a satellite network. A registered lower orbit satellite within a satellite network may broadcast a geolocation of a lost ASC to nearby ASCs in a geographical region. ASCs may relay information to financial institutions. ASCs may relay microwave communication ID and geolocation information using homomorphic encryption. Homomorphic encryption is a type of encryption that disables the possibility of deciphering in between delivery of the information.

A satellite may transmit a signal to nearby ATMs, POS machines, and ASCs that the ASC with given geocoordinates is lost or stolen. On receiving the signal, the ATM, POS machine, or ASC may not allow the ASC to transact. The ATM, POS machine, and ASC may not allow malicious activity.

An ASC may have a component that may send a beacon to a financial institution. A satellite may provide the geolocation of an ASC by determining where the ASC signal is coming from.

To determine whether an ASC is lost or stolen, a satellite may request an ASC user to validate whether their ASC was lost or stolen. Further, a stolen ASC usually moves around so a stationary ASC may be assumed to be lost while an ASC in motion may be assumed to be stolen.

A satellite may detect a cluster of stolen cards within a threshold geographic area. A high threshold density of stolen cards within the threshold geographic area may trigger a red system alert. The red system alert may indicate a high theft zone or area and may disallow ASC transactions or may require ASC multi-factor authentication. A medium threshold density of stolen cards within the threshold geographic area may trigger an amber or yellow system alert. The amber or yellow system alert may indicate a medium theft zone or area and may allow ASC transactions of $100 or less.

A satellite may be triggered to report a lost or stolen ASC if a user loses a threshold proximity from the ASC. The threshold proximity may be, e.g., 10 feet, 100 feet, 1000 feet, or 10,000 feet. A satellite may be triggered to report a lost or stolen ASC if a user does not use their ASC within a threshold time. The threshold time may be 1 day, 1 week, 1 month, or 1 year.

The satellite may receive a trigger to report a lost or stolen ASC by receiving a short message service ("SMS") payload from the lost or stolen ASC. The satellite may send ASCs located a threshold distance from the satellite information regarding the lost ASC (e.g., geolocation) and certain zones prone to theft.

The system may block an ASC transaction for a lost or stolen ASC. A suspicious ASC may not be allowed to transact. A suspicious ASC may give a beep message indicating it is stolen or lost.

Low orbit satellites may provide continuous monitoring, e.g., StarLink. 24 hour/7 days per week, continuous monitoring is possible with low orbit satellites. The ASC may send an alert signature to a satellite and the satellite may obtain the geolocation of the relaying message. The satellite may directly relay communications to ground units without going through a financial institution. The satellite may communicate autonomously even with connectivity loss.

The system may relay information to all nearest ASCs (e.g., located within a threshold distance from the nearest satellite) as part of a network of preventative detection and geofencing. The system is preventative because it may not allow ASC transactions within a red zone. Or the system may require multi-factor authentication within a red zone. Within a yellow zone, the system may have business rules such as not allowing ASC transactions over $100. The system may create geofencing based on user validation.

The system may have a process flow. The process flow may include a registered lower orbit satellite integration module. The registered lower orbit satellite integration module may create a payload message for the lost or stolen ASC and send the payload message to a satellite. The registered lower orbit satellite integration module may integrate the satellite with the stolen/lost ASC. The registered lower orbit satellite integration module may control the telemetry of the lost/stolen ASC.

The process flow may include a card proximity identifier. The card proximity identifier may determine whether a threshold distance exists between the ASC and the user.

The process flow may include a geolocation identifier. The geolocation identifier may determine the geolocation of each detected lost or stolen ASC.

The process flow may include a bank integration module. The bank integration module may integrate the lost/stolen ASC with a financial institution by allowing communications to flow between the lost/stolen ASC and the financial institution.

The process flow may include a homomorphic card data encryptor. The homomorphic card data encryptor may enable homomorphic encryption so the information may not be hacked in transit.

The process flow may include a generative AI builder. The generative AI builder may generate geographical patterns based on geolocations of lost/stolen ASCs. Using generative AI, the generative AI builder may adapt to dynamic ASC geolocation data.

The process flow may include a card network former. The card network former may enable a network of ASCs to be formed. The network of ASCs may be a red zone (e.g., high theft area), a yellow zone (e.g., medium theft area), or a green zone (e.g., low theft area).

The process flow may include an adaptive AI-based fraud detector. The adaptive AI-based fraud detector may continuously evolve and change its assessment of fraud based on information provided on an ongoing basis.

The process flow may include an ATM machines informer. The ATM machines informer may report a lost/stolen ASC to an ATM.

The process flow may include a POS machines informer. The POS machines informer may report a lost/stolen ASC to a POS machine.

The process flow may include a transaction decline module. The transaction decline module may decline an ASC transaction based on information provided.

The satellite may not detect only one time telemetry. The satellite may detect multiple geolocations and update the system accordingly. The satellite may track the geolocation of the lost/stolen ASC continuously. Further, multiple satellites within a satellite network may be tracking a lost/stolen ASC in a continuous fashion. The ASC tracking may be transferred from satellite to satellite within the satellite network.

The system may alert nearby ATMs/POS machines/ASCs with dynamic telemetry. The stolen ASC geolocation may be moving so the system may keep track of the lost/stolen ASC as it moves. Further, the satellite may alert other ATMs/POS machines/ASCs located a threshold distance from the stolen ASC, as the stolen ASC moves geographically. If there are no nearby ATMs/POS machines/ASCs, no ASC geofencing may be required.

The system may include dynamic telemetry geofencing—not necessarily static geofencing. The geofencing may be dynamic and adapt to the stolen ASC as it moves locations. The geofencing may be determined geometrically based on proximity to the stolen ASC.

The smart card may operate in a networked environment. The smart card may support establishing network connections to one or more remote computers. Such remote computers may be nodes on a network. The nodes may be personal computers or servers that include many or all the elements described above relative to the smart card. The network connections may include a local area network ("LAN") and a wide area network ("WAN") and may also include other networks. When used in a LAN networking environment, the smart card may be connected to the LAN through a network interface or adapter. The communication circuit may include the network interface or adapter.

It will be appreciated if the network connections shown are illustrative and other means of establishing a communications link between devices may be used. The existence of any of various well-known protocols such as TCP/IP, Ethernet, FTP, HTTP, and the like is presumed, and the smart card can be operated in a client-server configuration to permit a user to retrieve web pages from a web-based server. Web browsers can be used to display and manipulate data on web pages.

The smart card and network nodes may include various other components, such as a battery, speaker, and antennas (not shown). For example, network nodes may be portable devices such as a laptop, tablet, smartphone, or any other suitable device for receiving, storing, transmitting and/or displaying relevant information.

The smart card may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform tasks or implement abstract data types. The smart card may be operational with distributed computing environments where tasks are performed by remote processing devices that are linked through a communications network. In a distributed computing environment, program modules may be in both local and remote computer storage media including memory storage devices.

Each of the first and second ASC may also include a keypad. The keypad may include a display and numerical keys. The numerical keys may be configured to accept input of a personal identification number and a transaction amount.

It should be appreciated that the keypad may be deactivated when not in use. In certain embodiments, the keypad may be activated by the touch of any key on the keypad. The keypad may be responsive to actuation by a stylus. In other embodiments, to protect the smart card from being accessed by an outsider and/or from being pressed on unintentionally, the keypad may require input of one or more pre-determined numerical keys to activate the keypad.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the disclosure will now be described with reference to the accompanying drawings that form a part hereof. It is to be understood that other embodiments may be utilized, and that structural, functional, and procedural modifications may be made without departing from the scope and spirit of the present disclosure.

As will be appreciated by one of skill in the art, the disclosure described herein may be embodied in whole or in part as a method, a data processing system, or a computer program product. Accordingly, the disclosure may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or microwave transmission media (e.g., air and/or space).

FIG. 1 shows an ASC. The ASC 102 may include many components. The ASC, including each of the components, may not exceed the size of a credit card. ASC 102 shows illustrative dimensions that may be associated with the ASC. FIG. 1 shows that illustrative ASC may have a thickness of 0.8 mm, as shown at 112. FIG. 1 shows that the ASC may have a height of 53.98 mm, as shown at 114, and a width of 85.60 mm, as shown at 116.

ASC 102 may include embossed characters. The embossed characters may include an account number, expiration date, and the name of a cardholder.

ASC 102 may be a contactless ASC. The contactless element of the ASC may be enabled by the microwave included in the ASC. The microwave symbol, shown at 104, may indicate that this ASC may be used in a contactless transaction. Contactless transactions eliminate the need to swipe and/or insert a card into a POS device or any other card transceiver. The card can be placed within the pre-determined proximity and the POS device may be enabled to read the necessary data from the card.

The microwave enabled in this exemplary ASC may be a microwave. The microwave may enable one ASC to directly communicate and perform transactions with another satellite, ATM, POS device, and ASC. The ASC may be able to perform the transaction independent of any card transceiver or POS device.

ASC 102 may also include a keypad 106. Keypad 106 may include alpha-numeric keys and a display. ASC 102, in this exemplary diagram may be a debit card, as shown at 110. ASC 102 may be associated with an entity. The entity, as shown at 108, is Company A.

Figure 2:
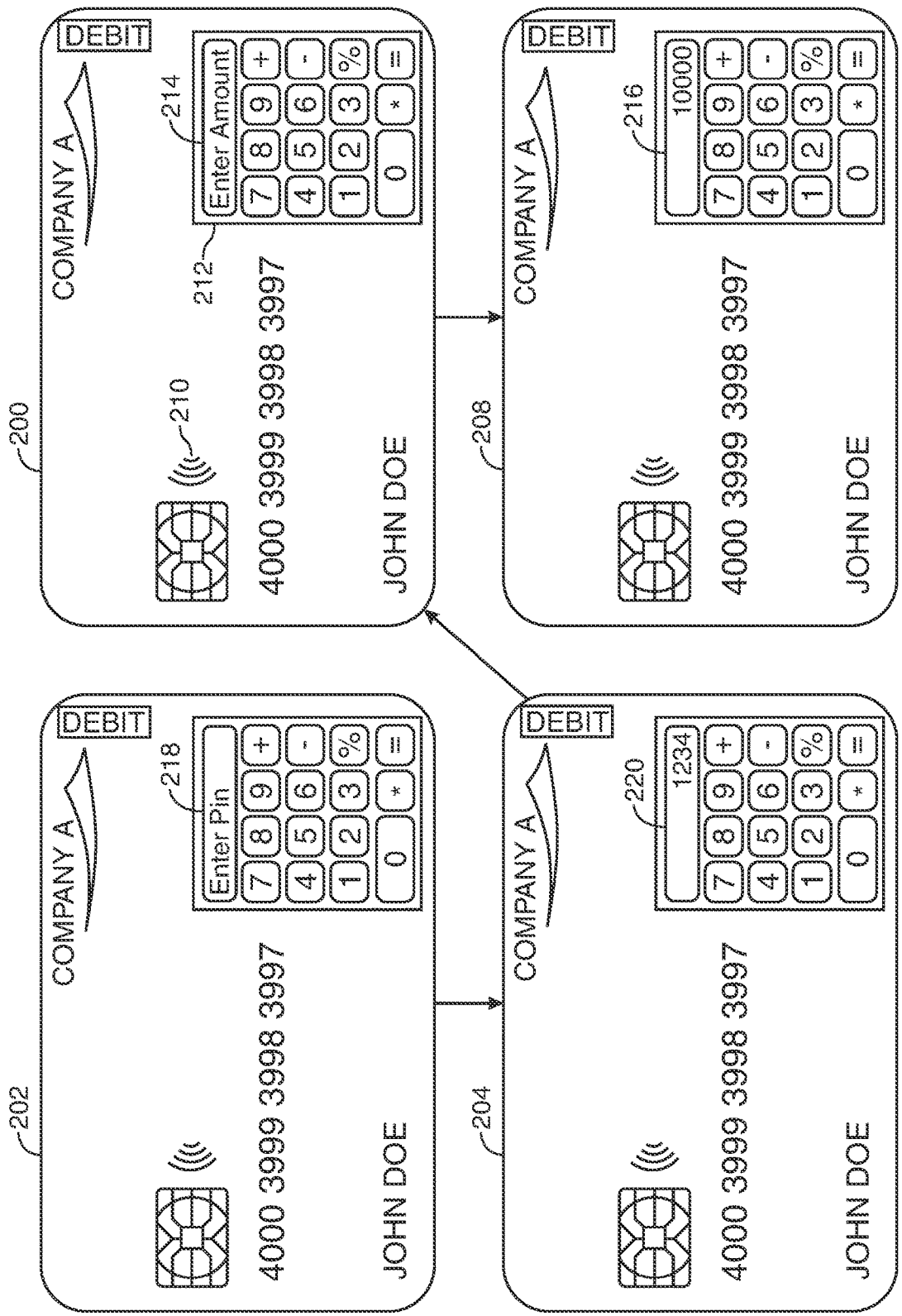
FIG. 2 shows an illustrative architecture in accordance with principles of the disclosure.

FIG. 2 shows an architecture 200 of an ASC 202 that includes an embedded microwave transceiver in accordance with principles of the disclosure. ASC 202 may be configured to directly communicate with a second ASC (not shown). ASC 202 may include both microwave hardware and software to enable the smart card to perform as a microwave device.

ASC 202 may include a microwave transceiver 204. ASC 202 may also include a nano microwave NIC 206 and a microprocessor 208. ASC 202 may also include a battery of 210. ASC 202 may also include a keypad 212. ASC 202 may also include a microwave tag. The microwave tag and additional memory 206 that may be enabled to store data associated with the ASC and the cardholder of the ASC.

ASC 202 may perform a transaction with another ASC. microwave capabilities may enable the cardholder to activate microwave communication on ASC 202. The microwave transceiver 204 may include a display connector 214. The display connector 214 may be enabled to capture the amount of the transaction and the PIN that may be inputted into the keypad 212. Display connector 214 may be connected to the keypad 212 and the microprocessor 208. Display connector 214 may transmit the captured data to microprocessor 208. The microwave transceiver may be enabled to be active using power supplied by battery 210.

The cardholder may then be able to send and receive payment and authentication data to another ASC. The cardholder may authenticate himself as the cardholder by inputting a PIN. Upon authentication, the cardholder of the recipient of the transaction may capture the PIN and a transaction amount.

The microwave transceiver 204 may be configured to activate microwave communication. The activation of the microwave communication may enable sending and receiving user payment and authentication data from one ASC to another ASC.

Figure 3:
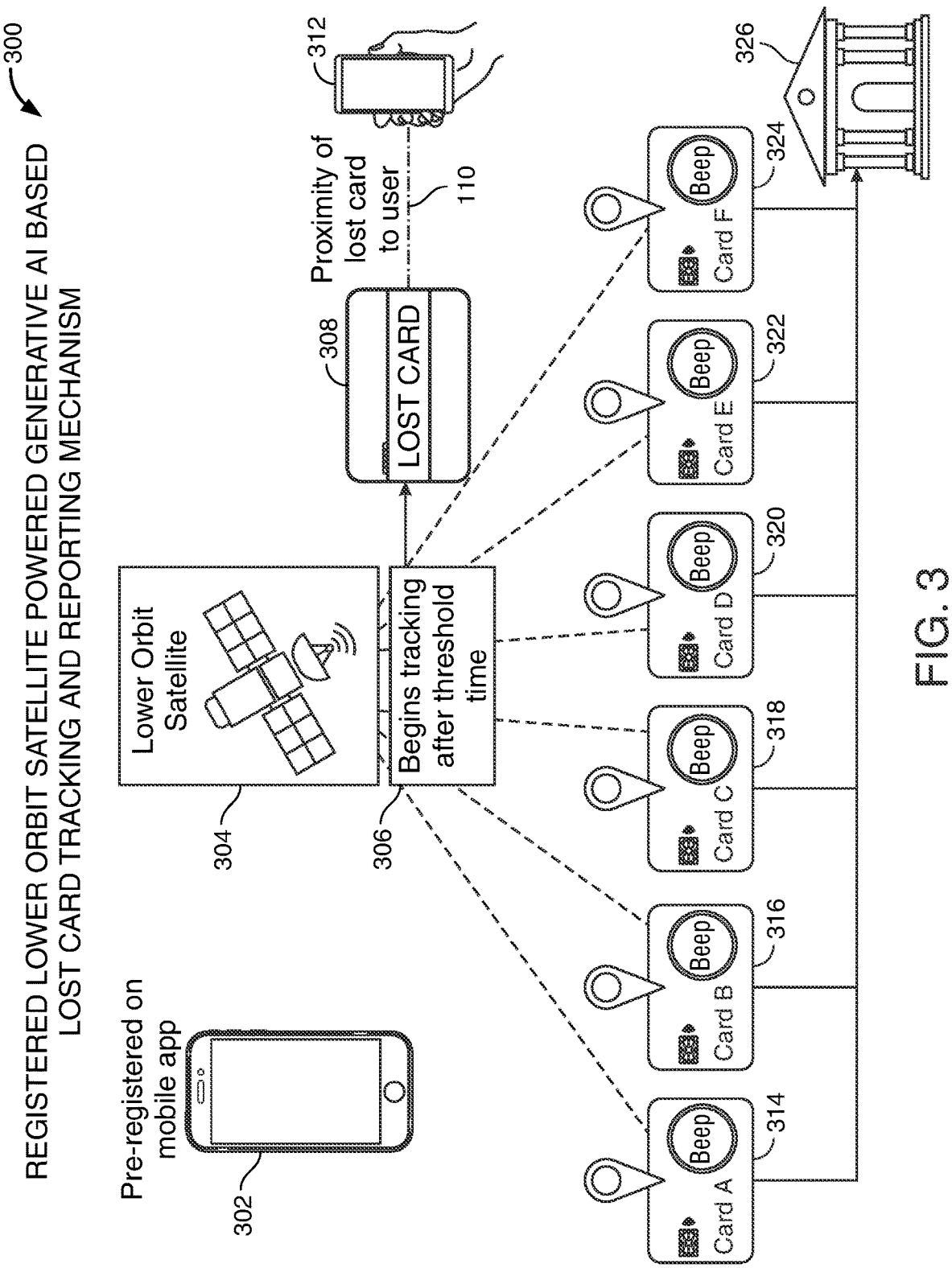
FIG. 3 shows an exemplary diagram in accordance with principles of the disclosure.

FIG. 3 shows an illustrative diagram 300 of a registered lower orbit satellite powered generative AI-based lost card tracking and reporting mechanism. Mobile device 302 may have a connection pre-registered on a mobile app. The mobile device 302 may be connected to a lower orbit satellite 304.

ASC 308 may become a "lost card" when ASC 308 loses a threshold proximity to a mobile device 312. A lost card may be determined based on a threshold proximity of the lost card to user 110 or mobile device 312. The threshold proximity may be, e.g., 1 foot, 10 feet, 100 feet, 500 feet, or 1000 feet. Mobile device 312 may have a connection to the lower orbit satellite 304 pre-registered on a mobile app. Lost ASC 308 may send a tracking beacon to the lower orbit satellite 304.

Lower orbit satellite 304 may begin tracking the lost ASC 308 after a threshold time elapsed. The threshold time may be, e.g., 1 minute, 10 minutes, 30 minutes, 1 hour, or 1 day. Lower orbit satellite 304 may send transmissions to ASCs located within a threshold distance to the lower orbit satellite 304, e.g., Card A 314, Card B 316, Card C 318, Card D 320, Card E 322, and Card F 324. The threshold distance may be 1000 feet, 1 mile, 10 miles, 20 miles, 30 miles, 40 miles, or 50 miles. The transmissions may contain geocoordinates and account information of the lost ASC 308. The nearby ASCs, e.g., Card A 314, Card B 316, Card C 318, Card D 320, Card E 322, and Card F 324, may then send the lost ASC 308's geocoordinates and account information to financial institution 326. The nearby ASCs may beep to indicate that the lost ASC 308 is communicating and transmitting data.

Figure 4:
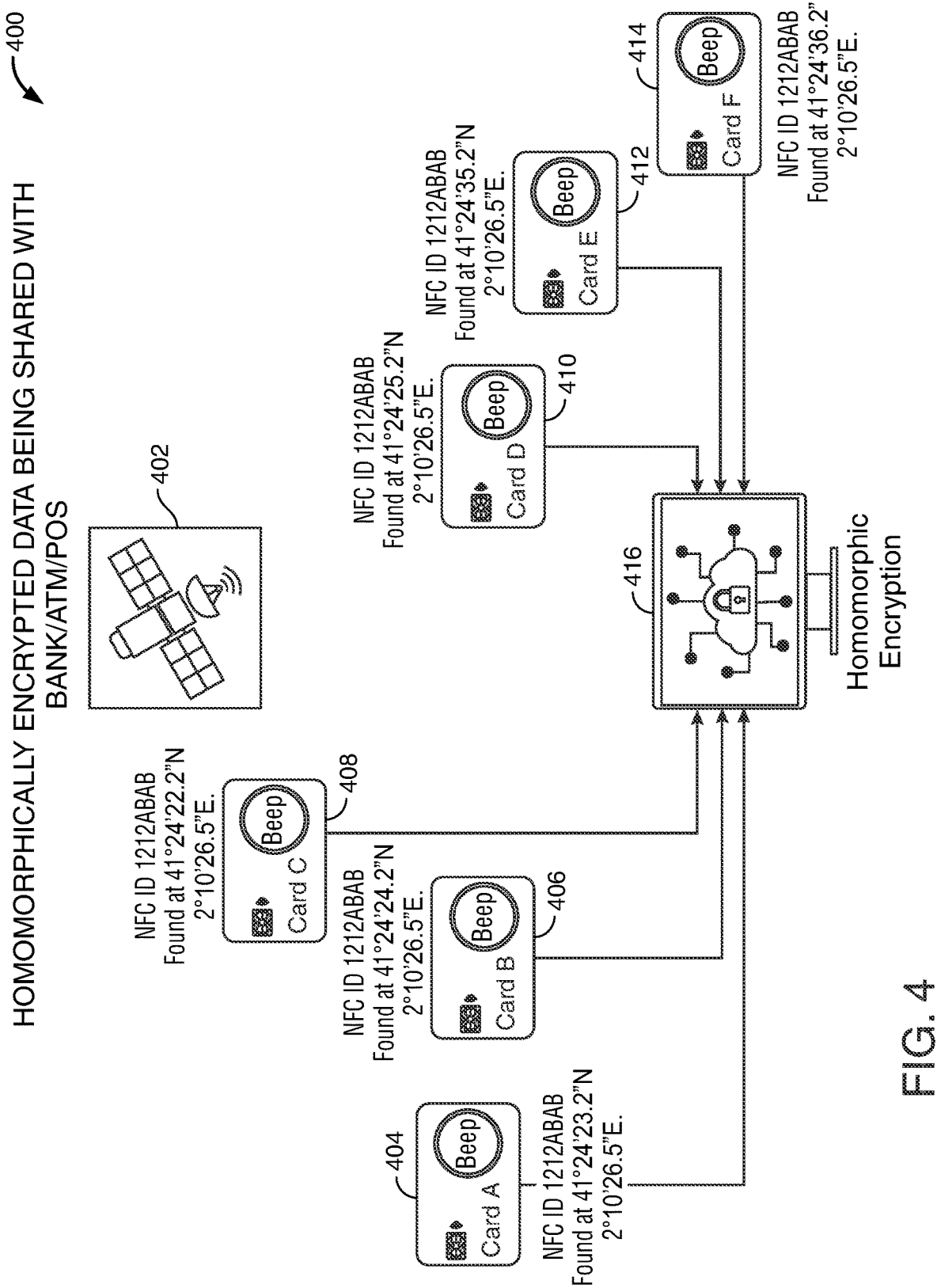
FIG. 4 shows an illustrative diagram in accordance with principles of the disclosure.

FIG. 4 shows an illustrative diagram 400 of a lower orbit satellite 402 sharing homomorphically encrypted data with, e.g., a bank/financial institution, an ATM, and a POS. The microwave communication ID of a lost ASC may be, e.g., 1212ABAB. The microwave communication ID of a lost ASC, and associated data, may be homomorphically encrypted. The homomorphically encrypted data may be transmitted to nearby ASCs.

One nearby ASC, Card A 404, be in a first position (e.g., 41°24'23.2" N 2°10'26.5" E), as shown at 404. Another nearby ASC, Card B 406, may be in another position (e.g., 41°24'24.2" N 2°10'26.5" E), as shown at 406. So too, other nearby ASCs, e.g., Card C 408, Card D 410, Card E 412, and Card F 414, may be located in other positions (e.g., 41°24'22.2" N 2°10'26.5" E, 41°24'25.2" N 2°10'26.5" E, 41°24'35.2" N 2°10'26.5" E, and 41°24'36.2" N 2°10'26.5" E, respectively).

Nearby ASCs, e.g., Card A 404, Card B 406, Card C 408, Card D 410, Card E 412, and Card F 414, may all be within a threshold proximity of the lower orbit satellite 402. The threshold proximity may be, e.g., 1000 feet, 1 mile, 2 miles, 3 miles, 4 miles, 5 miles, 10 miles, 50 miles, or 100 miles. The nearby ASCs may beep to indicate that a lost ASC is communicating and transmitting data. It should be appreciated that exemplary microwave communication ranges may be 0-1 inch,
0-1.5 inches, 0-2 inches, 0-2.5 inches, 0-3 inches, 0-3.5 inches, 0-4 inches, 0-4.5 inches, 0-5 inches, or any other suitable range supported by microwave apparatus.

The nearby ASCs, e.g., Card A 404, Card B 406, Card C 408, Card D 410, Card E 412, and Card F 414, may interact with a homomorphic encryption module as shown at 416. At the homomorphic encryption module 416, the homomorphically encrypted data regarding the lost ASC may be unencrypted. The unencrypted data may then be transmitted to financial institutions, ATMs, and POS machines.

Figure 5:
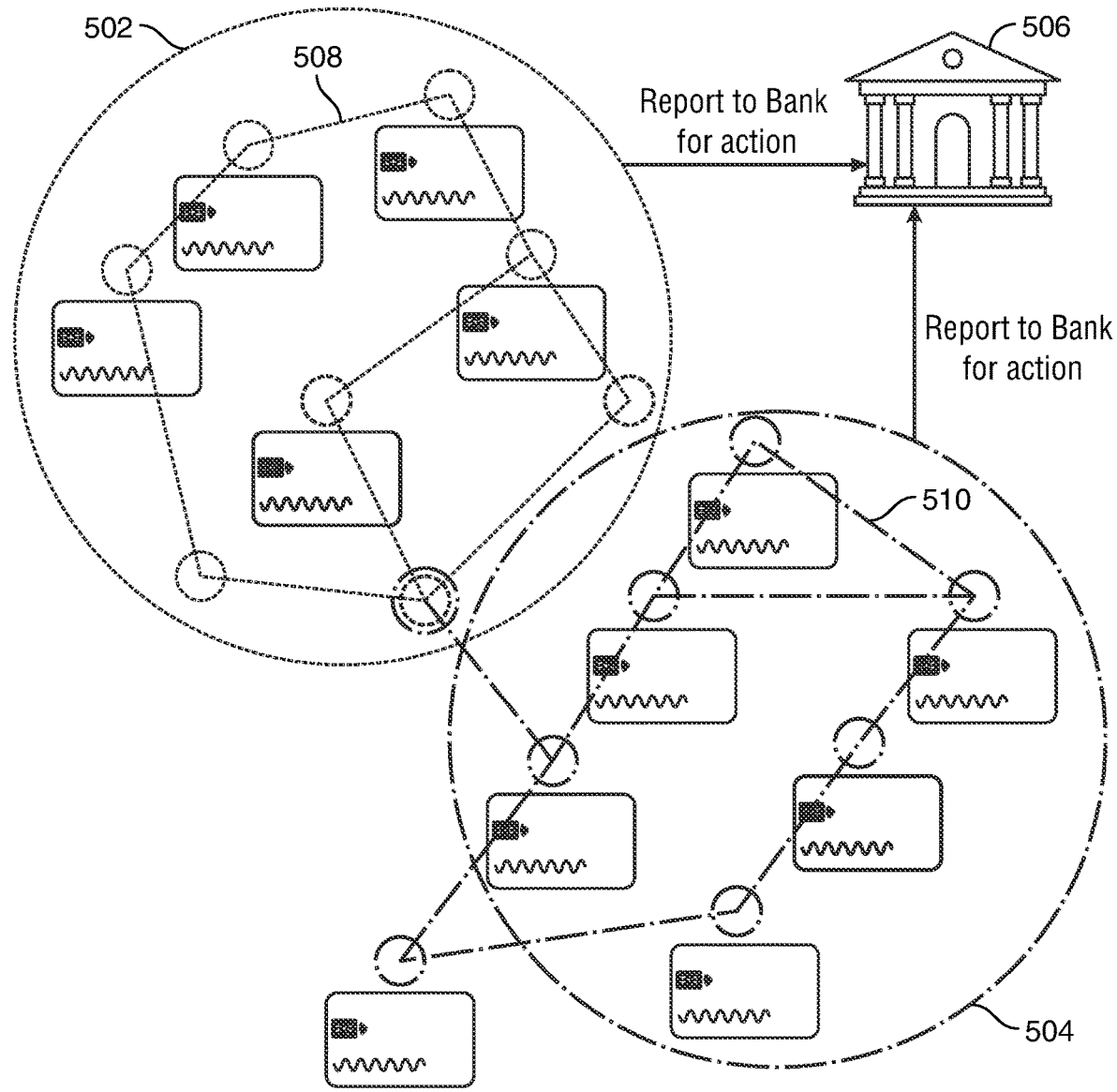
FIG. 5 shows an illustrative diagram in accordance with principles of the disclosure.

FIG. 5 shows an exemplary diagram 500 of a generative AI pattern created by the technology provided. The pattern may be generated by a generative AI system. The pattern generated may indicate a level of severity of theft in a particular zone (e.g., area). One level of severity of theft may be, e.g., a high theft zone. One level of severity of theft may be, e.g., high but a comparatively lower theft zone.

The generative AI pattern may be, e.g., in an area or zone where a threshold number of lost ASCs are reported in a threshold area. The threshold number of lost ASCs may be, e.g., 5, 10, 15, 20, 25, 50, 100, or 1000 lost ASCs. The threshold area may be, e.g., 1, 5, 10, 20, 25, 50, 100, or 1000 square miles. One area, 502, may be considered a high theft zone. There, lost ASCs, 508, may be reported as stolen ASCs greater than 50% of all lost and stolen ASCs combined. Another area, 504, may be considered a high but comparatively lower theft zone. There, lost ASCs, 510, may be reported with a lower degree of theft (e.g., more lost rather stolen). The percentage of stolen ASCs there may be, e.g., greater than 25% but less than 50% of all lost and stolen ASCs combined.

Figure 6:
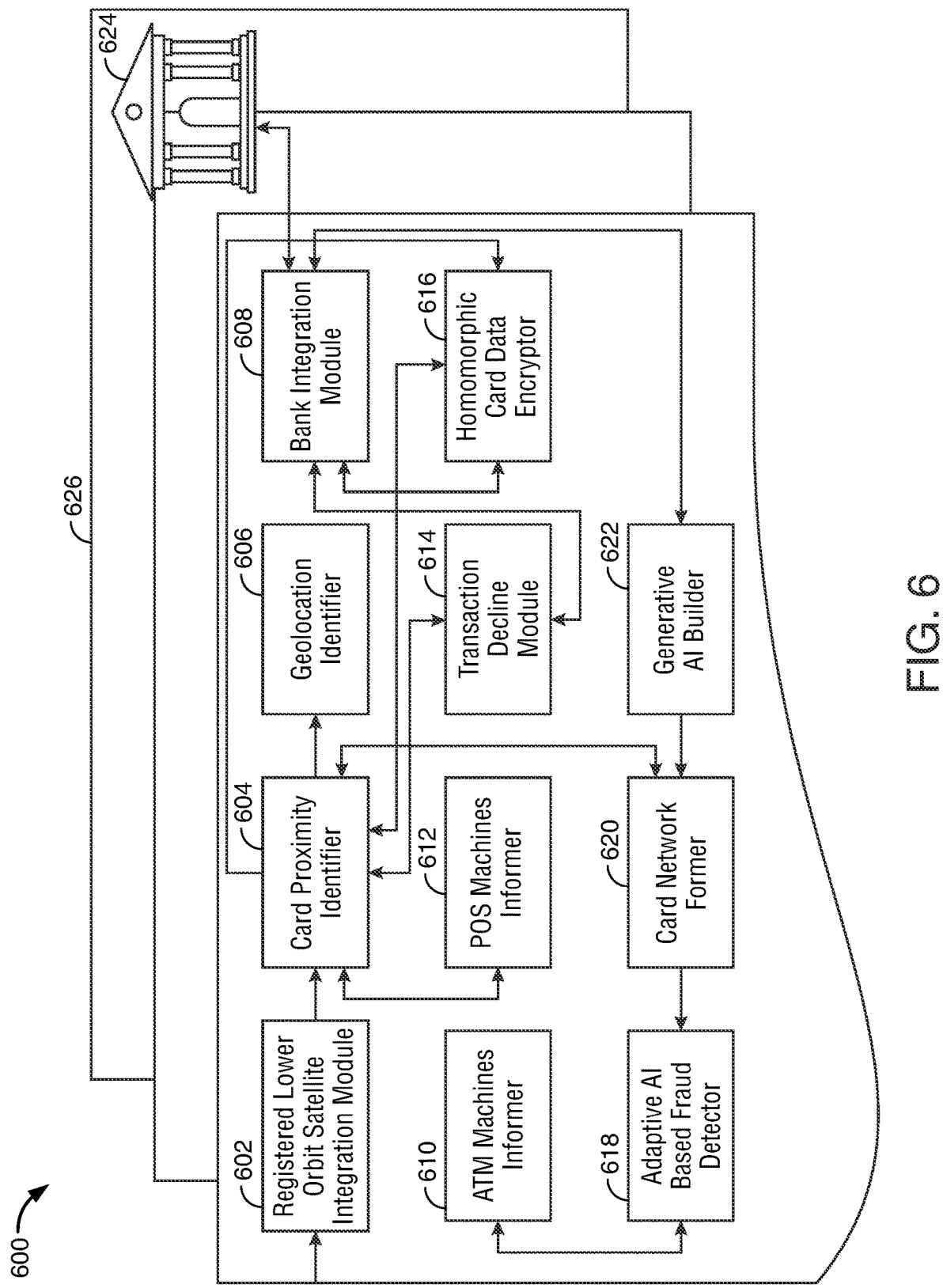
FIG. 6 shows an illustrative flowchart in accordance with principles of the disclosure.

FIG. 6 shows an exemplary flowchart 600 of a registered lower orbit satellite-powered generative AI-based lost card tracking and reporting mechanism 626.

At step 602, a registered lower orbit satellite integration module may be activated. The registered lower orbit satellite integration module may integrate a lower orbit satellite with a potentially lost ASC. At step 604, a card proximity identifier may be activated. The card proximity identifier 604 may identify a proximity between a potentially lost ASC and a user device.

Once a threshold proximity between a lost card (e.g., a lost ASC) and an associated user device is detected, the system may activate geolocation identifier 606. The geolocation identifier 606 may identify the geolocation of a lost ASC. As shown at step 608, the bank integration module may then be activated. The bank integration module may integrate a lost ASC with a financial institution 624.

From there, data from the lost ASC (e.g., microwave communication ID) may be homomorphically encrypted by a homomorphic card data encryptor 616. The homomorphic card data encryptor 616 may encrypt lost ASC data such that the lost ASC data cannot be hacked by an intermediate entity. After the lost ASC integrates with a financial institution via the bank integration module, 608, the system may activate a transaction decline module 614. The transaction decline module 614 may disable the ability to conduct transactions using the lost ASC (e.g., determining a lost ASC via encrypted microwave communication ID).

From the card proximity identifier 604, the system may activate POS machines informer 612. The POS machines informer may inform POS machines within a threshold proximity of the lost ASC. The POS machines informer may transmit lost ASC data to POS machines.

From the bank integration module 608, a generative AI builder 622 may be activated. The generative AI builder 622 may generate patterns using generative AI. The generative AI patterns may indicate, e.g., high theft zones, medium theft zones, and low theft zones.

From there, a card network former 620 may be activated. The card network former 620 may create a network of ASCs within a generated AI pattern zone. The network of ASCs within a generated AI pattern zone may be in communication with each other via microwave.

From there, an adaptive AI-based fraud detector 618 may be activated. The adaptive AI-based fraud detector 618 may use machine learning ("ML") to adapt and learn based on fraud detected in real time. The adaptive AI-based fraud detector 618 may then activate an ATM machine informer 610. The ATM machine informer 610 may inform ATMs located a threshold distance from the lower orbit satellite regarding the lost ASC. The lost ASC may be disabled from transacting with the informed ATMs.

Figure 7:
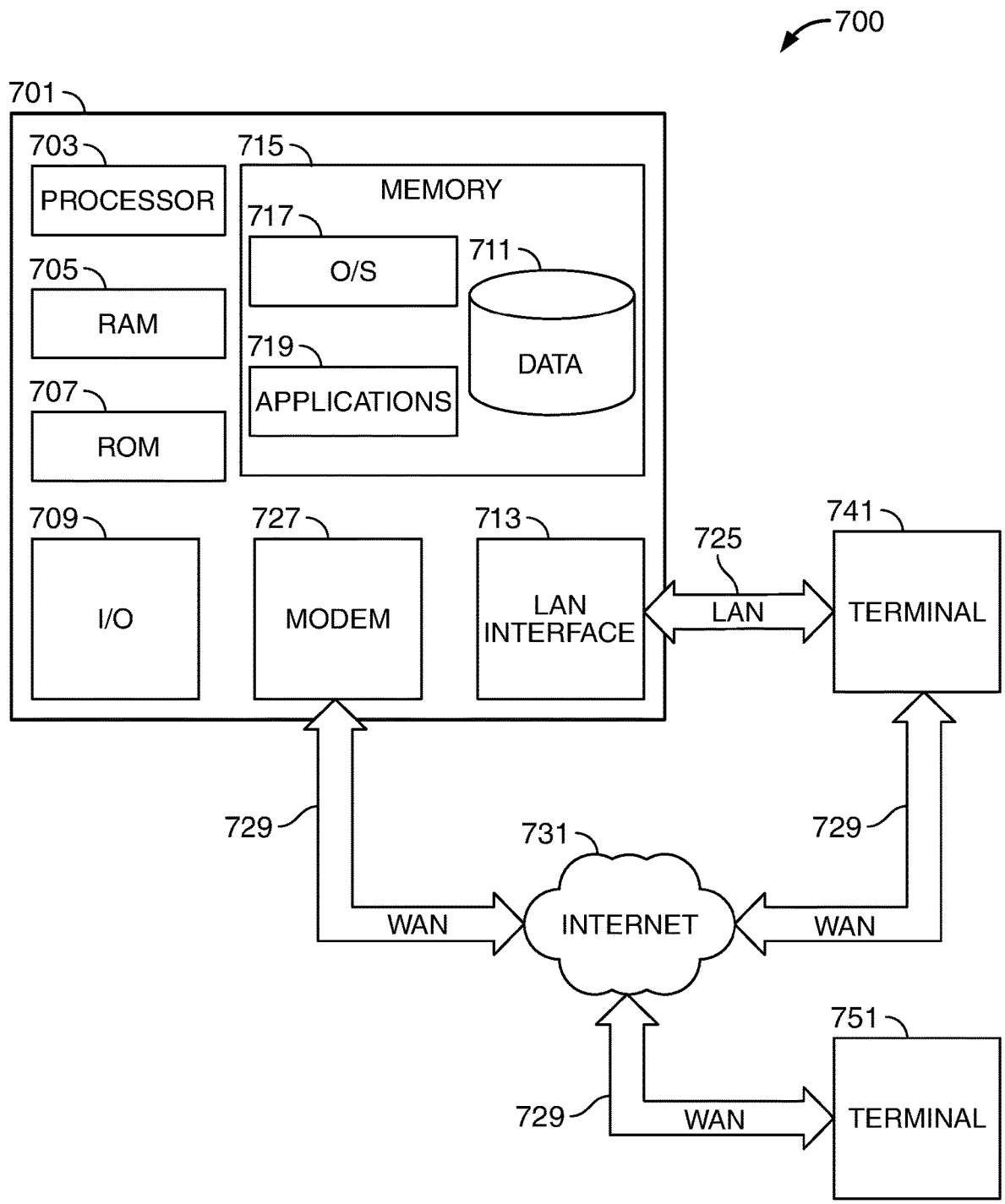
FIG. 7 shows an illustrative system that may be used in accordance with the principles of the disclosure.
Figure 8:
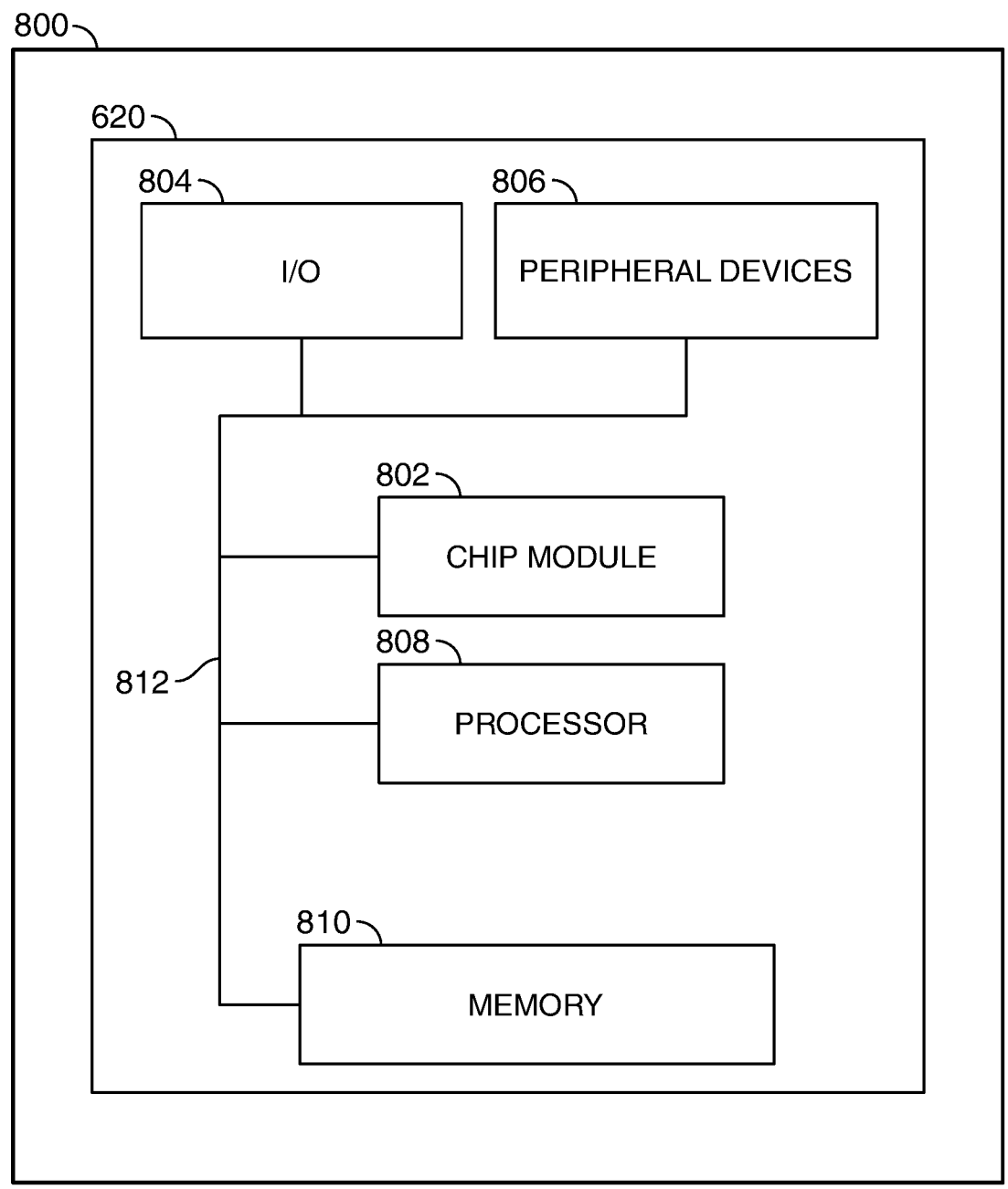
FIG. 8 shows an illustrative system that may be used in accordance with the principles of the disclosure along with some of the system shown in FIG. 7.

FIG. 7 shows an illustrative block diagram of system 700 that includes computer 701. Computer 701 may alternatively be referred to herein as a "server" or a "computing device." Computer 701 may be a workstation, desktop, laptop, tablet, smart phone, ATM, satellite, or any other suitable computing device. Elements of system 700, including computer 701, may be used to implement various aspects of the systems and methods disclosed herein.

Computer 701 may have a processor 703 for controlling the operation of the device and its associated components, and may include RAM 705, ROM 707, input/output module 709, and a memory 715. The processor 703 may also execute all software running on the computer—e.g., the operating system and/or voice recognition software. Other components commonly used for computers, such as EEPROM or Flash memory or any other suitable components, may also be part of the computer 701.

Memory 715 may be comprised of any suitable permanent storage technology—e.g., a hard drive. The memory 715 may store software including the operating system 717 and application(s) 719 along with any data 711 needed for the operation of the system 700. Memory 715 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 701 may execute the instructions embodied by the software to perform various functions.

Input/output ("I/O") module may include connectivity to a microphone, keyboard, touch screen, mouse, and/or stylus through which a user of computer 701 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 700 may be connected to other systems via a LAN interface 713. System 700 may operate in a networked environment supporting connections to one or more remote computers, such as terminals 741 and 751. Terminals 741 and 751 may be personal computers or servers that include many or all the elements described above relative to system 700.

The network connections depicted in FIG. 7 include a LAN 725 and a WAN 729 but may also include other networks. When used in a LAN networking environment, computer 701 is connected to LAN 725 through a LAN interface or adapter 713. When used in a WAN networking environment, computer 701 may include a modem 727 or other means for establishing communications over WAN 729, such as Internet 731.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719 that may be used by computer 701, may include computer executable instructions for invoking user functionality related to communication, such as e-mail, Short Message Service ("SMS"), and voice input and speech recognition applications. Application program(s) 719 (which may be alternatively referred to herein as "plugins," "applications," or "apps") may include computer executable instructions for invoking user functionality related performing various tasks. The various tasks may be related to database backup, search, and recovery.

Computer 701 and/or terminals 741 and 751 may also be devices including various other components, such as a battery, speaker, and/or antennas (not shown).

Terminal 751 and/or terminal 741 may be portable devices such as a laptop, cell phone, Blackberry™, tablet, smartphone, or any other suitable device for receiving, storing, transmitting and/or displaying relevant information. Terminals 751 and/or terminal 741 may be other devices. These devices may be identical to system 700 or different. The differences may be related to hardware components and/or software components.

Any information described above in connection with database 711, and any other suitable information, may be stored in memory 715. One or more of applications 719 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

System 800 may include one or more of the following components: I/O circuitry 804 that may include a transmitter device and a computer device and may interface with fiber optic cable, coaxial cable, telephone lines, microwave devices, PHY layer hardware, a camera/display control device or any other suitable media or devices; peripheral devices 806 that may include counter timers, real-time timers, power-on reset generators or any other suitable peripheral devices; logical processing device 808 that may compute data structural information and structural parameters of the data; and machine-readable memory 810.

Machine-readable memory 810 may be configured to store in machine-readable data structures: machine executable instructions (which may be alternatively referred to herein as "computer instructions" or "computer code"), applications, signals, and/or any other suitable information or data structures.

Components 802, 804, 806, 808 and 810 may be coupled together by a system bus or other interconnections 812 and may be present on one or more circuit boards such as 820. In some embodiments, the components may be integrated into a single chip. The chip may be silicon-based.

Thus, methods and systems for registered lower orbit satellite-powered generative AI-based lost ASC tracking and reporting are provided. Persons skilled in the art will appreciate that the present disclosure can be practiced by other than the described embodiments that are presented for purposes of illustration rather than of limitation, and that the present disclosure is limited only by the claims that follow.

What is claimed is:

1. A method for registered lower orbit satellite-powered generative artificial intelligence ("AI")-based lost active smart card ("ASC") tracking and reporting, the method comprising:
    detecting a threshold distance between a lost ASC and a user device, the lost ASC:
        being an initiator of a reporting, the reporting communicating from the lost ASC to a registered lower orbit satellite in a satellite network;
        comprising a microwave communication transceiver and a keypad, the reporting enabled using the microwave communication transceiver;
        being not thicker than 0.8 millimeters ("mm"); and
        being associated with an originating entity;
    in response to receiving the reporting from the ASC, determining a length of time during which the ASC was located, away from the user device, at a distance greater than or equal to the threshold distance, and determining that the length of time is at least as great as a threshold time;
    initiating, in response to determining that the length of time is at least as great as a threshold time, a microwave communication between the lost ASC and the registered lower orbit satellite in a satellite network, the registered lower orbit satellite in the satellite network being a target of the reporting;
    securing, using a microwave communication identification ("ID"), a line of communication between the microwave communication transceiver and the registered lower orbit satellite in the satellite network by:
        receiving, from the microwave communication transceiver on the lost ASC, the microwave communication ID;
        verifying the microwave communication ID with the originating entity, the microwave communication ID being transmitted to the registered lower orbit satellite by a microprocessor of the lost ASC; and
        in response to the verifying, further securing the line of communication between the microwave communication transceiver and the registered lower orbit satellite in the satellite network by:
            receiving, from the lost ASC, a geolocation;
            encrypting, using a homomorphic card data encryptor associated with the lost ASC, the geolocation of the lost ASC;
            receiving, from the lost ASC, a homomorphically encrypted geolocation;
            transmitting, using a microprocessor, the homomorphically encrypted geolocation of the lost ASC to ASCs located within a threshold distance from the lost ASC;
            verifying and thereby further securing, that the homomorphically encrypted geolocation is equal to the geolocation of the lost ASC; and
            in response to the verifying, tracking the geolocation of the lost ASC by submitting instructions to the lost ASC, instructing the lost ASC to emit a beeping noise, and reporting lost ASC geocoordinates to the originating entity; the lost ASC emitting the beeping noise in response to receipt of the instructions from the satellite network.

2. The method of claim 1 wherein following the initiating, the method comprising:
    retrieving, by the lost ASC, data associated with the originating entity of the ASCs located within a threshold distance from the lost ASC;
    confirming, by the lost ASC, whether the originating entity associated with the lost ASC is the originating entity of the ASCs located within a threshold distance from the lost ASC; and
    terminating, by the lost ASC, the microwave communication, if the originating entity associated with the lost ASC is not the originating entity of the ASCs located within a threshold distance from the lost ASC.

3. The method of claim 1 wherein following the initiating, the method comprising:
    retrieving, by the lost ASC, data associated with the originating entity of the ASCs located within a threshold distance from the lost ASC;
    confirming, by the lost ASC, whether the originating entity associated with the lost ASC is the originating entity of the ASCs located within a threshold distance from the lost ASC; and
    enabling, by the lost ASC, the microwave communication, if the originating entity for the lost ASC is the originating entity of the ASCs located within a threshold distance from the lost ASC.

4. The method of claim 1 wherein following the in response to the verifying, the method comprises:
    generating geographical patterns via a generative AI builder, the geographical patterns being based at least in part on geolocations of stolen ASCs located within a threshold area; and
    adapting the geographical patterns, via the generative AI builder, to dynamic ASC geolocation data.

5. The method of claim 4 wherein, following the generating geographical patterns via a generative AI builder, the method comprises:
    forming a network of stolen ASCs via a card network former based on the geolocations of stolen ASCs located within the threshold area, wherein the network of stolen ASCs determines the geographical patterns for a red zone, the red zone being an area with greater than a threshold number of stolen ASCs, a yellow zone, the yellow zone being an area with a threshold number of stolen ASCs, and a green zone, the green zone being an area with less than a threshold number of stolen ASCs.

6. The method of claim 5 wherein following the forming a network of stolen ASCs via a card network former, the method comprises modifying the geographical patterns by an adaptive AI-based fraud detector, wherein the adaptive AI-based fraud detector continuously monitors and modifies the geographical patterns based at least in part on an assessment of fraud by detecting changes in stolen ASCs within the threshold area.

7. The method of claim 5 wherein, within the red zone, ASC transactions are not allowed.

8. The method of claim 5 wherein, within the red zone, ASC transactions require multi-factor authentication.

9. The method of claim 5 wherein, within the yellow zone, ASC transactions over $100 are not allowed.

10. The method of claim 5 wherein, within the green zone, ASC transactions over $1000 are not allowed.

11. The method of claim 1 wherein following the in response to the verifying, the method comprises reporting information regarding the lost ASC to an ATM via an ATM machines informer.

12. The method of claim 1 wherein following the in response to the verifying, the method comprises reporting information regarding the lost ASC to a POS machine via a POS machines informer.

13. The method of claim 1 wherein following the in response to the verifying, the method comprises declining an ASC transaction for the lost ASC via a transaction decline module.

14. The method of claim 1 wherein the lost ASC and the ASCs located within a threshold distance from the lost ASC are each equal to a size not smaller than 90% of 86 mm (width)×54 mm (height).

15. A lost active smart card ("ASC") comprising:
a microwave communication transceiver configured to enable a microwave communication with another microwave communication-enabled device;
a battery configured to power the microwave communication transceiver;
an originating entity associated with the lost ASC;
a thickness wherein the lost ASC, at its thickest point, is not thicker than 0.8 millimeters ("mm");
a width and height of the lost ASC is not smaller than 90% of a width of 86 mm and not smaller than 90% of a height of 54 mm;
a keypad embedded on the lost ASC, the keypad comprising a display and alpha-numerical keys, wherein each alpha-numerical key is configured to be depressed and the keypad does not extend a thickness greater than 0.8 mm;
a microprocessor enabling processing, storing and transmitting card ID data, the microprocessor further enabled to communicate with a payment network associated with the originating entity;
a nano microwave network interface card ("NIC") card to enable establishing a microwave connection to a user device; and
a display connector configured to intermediate between the keypad, the display and the microprocessor;
wherein, when the lost ASC is within a threshold distance of a user device, the user device comprising a microwave communication transceiver, the lost ASC and the user device are configured to activate the microwave communication and activate a registered lower orbit satellite in a satellite network to perform a registered lower orbit satellite-powered generative artificial intelligence ("AI")-based lost ASC tracking and reporting, the tracking and reporting comprising:
detecting a threshold distance between the lost ASC and the user device; the lost ASC:
being an initiator of a reporting, the reporting communicating from the lost ASC to a registered lower orbit satellite in a satellite network;
comprising a microwave communication transceiver; and
being associated with an originating entity;
in response to receiving the reporting from the ASC, determining a length of time during which the ASC was located, away from the user device, at a distance greater than or equal to the threshold distance, and determining that the length of time is at least as great as a threshold time;
initiating, in response to determining that the length of time is at least as great as a threshold time, a microwave communication between the lost ASC and a registered lower orbit satellite in a satellite network, the registered lower orbit satellite in a satellite network being a target of the reporting, wherein the lost ASC is not thicker than 0.8 millimeters ("mm") and comprises a keypad, the initiating enabled using the microwave communication transceiver;
securing, using a microwave communication identification ("ID"), a line of communication between the microwave communication transceiver and the registered lower orbit satellite in the satellite network by:
receiving, from the microwave communication transceiver on the lost ASC, the microwave communication ID;
verifying the microwave communication ID with the originating entity, the microwave communication ID being transmitted to the registered lower orbit satellite by a microprocessor of the lost ASC; and
in response to the verifying, further securing the line of communication between the microwave communication transceiver and the registered lower orbit satellite in the satellite network by:
receiving, from the lost ASC, a geolocation;
encrypting, using a homomorphic card data encryptor associated with the lost ASC, the geolocation of the lost ASC;
receiving, from the lost ASC, a homomorphically encrypted geolocation;
transmitting, using a microprocessor, the homomorphically encrypted geolocation of the lost ASC to ASCs located within a threshold distance from the lost ASC;
verifying and thereby further securing, that the homomorphically encrypted geolocation is equal to the geolocation of the lost ASC; and
in response to the verifying, tracking the geolocation of the lost ASC by submitting instructions to the lost ASC, instructing the lost ASC to emit a beeping noise, and reporting lost ASC geocoordinates to the originating entity; the lost ASC emitting the beeping noise in response to receipt of the instructions from the satellite network.

16. The ASC of claim 15 wherein following the initiating, the tracking and reporting comprises:
retrieving, by the lost ASC, data associated with the originating entity of the ASCs located within a threshold distance from the lost ASC;
confirming, by the lost ASC, whether the originating entity associated with the lost ASC is the originating entity of the ASCs located within a threshold distance from the lost ASC; and
terminating, by the lost ASC, the microwave communication, if the originating entity associated with the lost ASC is not the originating entity of the ASCs located within a threshold distance from the lost ASC.

17. The ASC of claim 15 wherein following the initiating, the tracking and reporting comprises:
retrieving, by the lost ASC, data associated with the originating entity of the ASCs located within a threshold distance from the lost ASC;
confirming, by the lost ASC, whether the originating entity associated with the lost ASC is the originating entity of the ASCs located within a threshold distance from the lost ASC; and
enabling, by the lost ASC, the microwave communication, if the originating entity for the lost ASC is the originating entity of the ASCs located within a threshold distance from the lost ASC.

18. The ASC of claim 15 wherein following the in response to the verifying, the tracking and reporting comprises:
generating geographical patterns via a generative AI builder, the geographical patterns being based on geolocations of stolen ASCs located within a threshold area; and
adapting the geographical patterns, via the generative AI builder, to dynamic ASC geolocation data.

19. A smart card system, the system enabling a performing a registered lower orbit satellite-powered generative artificial intelligence ("AI")-based lost active smart card ("ASC") tracking and reporting, the system comprising:
a lost ASC, the lost ASC comprising:
a microwave communication transceiver configured to enable a microwave communication with another microwave communication-enabled device;
a battery configured to power the microwave communication transceiver;
an originating entity associated with the lost ASC;
a thickness of the lost ASC, at its thickest point, is not thicker than 0.8 millimeters ("mm");
a microprocessor enabling processing, storing, and transmitting card ID data, the microprocessor further enabled to communicate with a payment network associated with the originating entity; and
a nano microwave network interface card ("NIC") card to enable establishing a microwave connection to a user device;
an originating entity associated with the lost ASC;
a registered lower orbit satellite in a satellite network; and
a user device;
wherein the registered lower orbit satellite performs a registered lower orbit satellite-powered generative AI-based lost ASC tracking and reporting comprises:
detecting a threshold distance between a lost ASC and the user device; the lost ASC:
being an initiator of a reporting;
comprising a microwave communication transceiver; and
being associated with an originating entity;
in response to receiving the reporting from the ASC, determining a length of time during which the ASC was located, away from the user device, at a distance greater than or equal to the threshold distance, and determining that the length of time is at least as great as a threshold time;
initiating, in response to determining that the length of time is at least as great as a threshold time, a microwave communication between the lost ASC and a registered lower orbit satellite in a satellite network, the registered lower orbit satellite in a satellite network being a target of the reporting, wherein the lost ASC comprises a keypad, and, at its thickest point, is not thicker than 0.8 millimeters ("mm"), the initiating enabled using the microwave communication transceiver;
securing, using a microwave communication identification ("ID"), a line of communication between the microwave communication transceiver and the registered lower orbit satellite in the satellite network by:
receiving, from the microwave communication transceiver on the lost ASC, the microwave communication ID;
verifying the microwave communication ID with the originating entity, the microwave communication ID being transmitted to the registered lower orbit satellite by a microprocessor of the lost ASC; and
in response to the verifying, further securing the line of communication between the microwave communication transceiver and the registered lower orbit satellite in the satellite network by:
receiving, from the lost ASC, a geolocation;
encrypting, using a homomorphic card data encryptor associated with the lost ASC, the geolocation of the lost ASC;
receiving, from the lost ASC, a homomorphically encrypted geolocation;
transmitting, using a microprocessor, the homomorphically encrypted geolocation of the lost ASC to ASCs located within a threshold distance from the lost ASC;
verifying and thereby further securing, that the homomorphically encrypted geolocation is equal to the geolocation of the lost ASC; and
in response to the verifying, tracking the geolocation of the lost ASC by submitting instructions to the lost ASC, instructing the lost ASC to emit a beeping noise, and reporting lost ASC geocoordinates to the originating entity; the lost ASC emitting the beeping noise in response to receipt of the instructions from the satellite network.

20. The system of claim 19 wherein following the initiating, the tracking and reporting comprises:
retrieving, by the lost ASC, data associated with the originating entity of the ASCs located within a threshold distance from the lost ASC;
confirming, by the lost ASC, whether the originating entity associated with the lost ASC is the originating entity of the ASCs located within a threshold distance from the lost ASC; and
enabling, by the lost ASC, the microwave communication, if the originating entity for the lost ASC is the originating entity of the ASCs located within a threshold distance from the lost ASC.

* * * * *